United States Patent [19]

Wheelock

[11] 4,150,835
[45] Apr. 24, 1979

[54] GROOVED SHAFT SEAL

[76] Inventor: Edward A. Wheelock, 641 Schooner Point, Schaumburg, Ill. 60194

[21] Appl. No.: 765,806

[22] Filed: Feb. 4, 1977

[51] Int. Cl.² ........................ F16H 55/00; F16J 15/32
[52] U.S. Cl. .................................... 277/165; 277/203; 74/388 PS; 74/459; 308/187.1
[58] Field of Search .................. 277/40, 41, 81 R, 84, 277/92, 94, 95, 142, 152, 165, 167, 203, 214; 74/388 PS, 424.8 R, 459; 308/187.1

[56] References Cited

U.S. PATENT DOCUMENTS

| 2,249,141 | 7/1941 | Johnson | 308/187.1 X |
| 2,560,917 | 7/1951 | Bebinger | 277/165 |
| 2,936,643 | 5/1960 | Smith et al. | 74/388 PS X |
| 2,964,967 | 12/1960 | Osborne | 74/388 PS X |
| 3,116,931 | 1/1964 | Edwards | 74/459 X |

FOREIGN PATENT DOCUMENTS

| 693131 | 7/1940 | Fed. Rep. of Germany | 277/165 |
| 585898 | 2/1947 | United Kingdom | 277/152 |

Primary Examiner—Robert S. Ward, Jr.
Attorney, Agent, or Firm—Haight, Hofeldt, Davis & Jambor

[57] ABSTRACT

This specification discloses a seal for a threaded shaft which reciprocates relative to a housing. The seal includes radial reinforcing means to provide an interference sealing fit with the housing and a thread on its internal surface which mates with the shaft. An axial reinforcing ring together with a hard rubber permits the seal to accept large axial forces.

9 Claims, 3 Drawing Figures

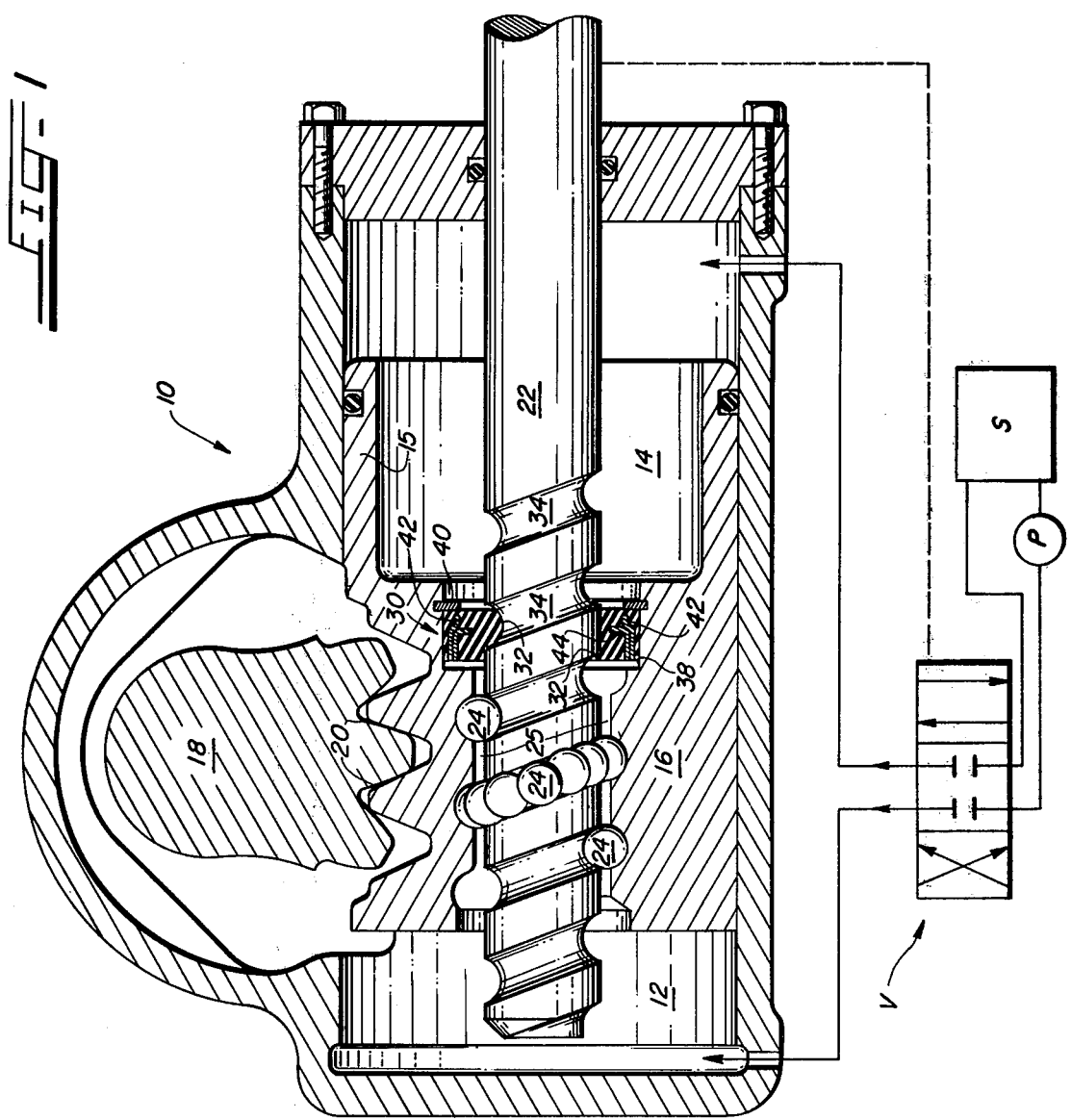

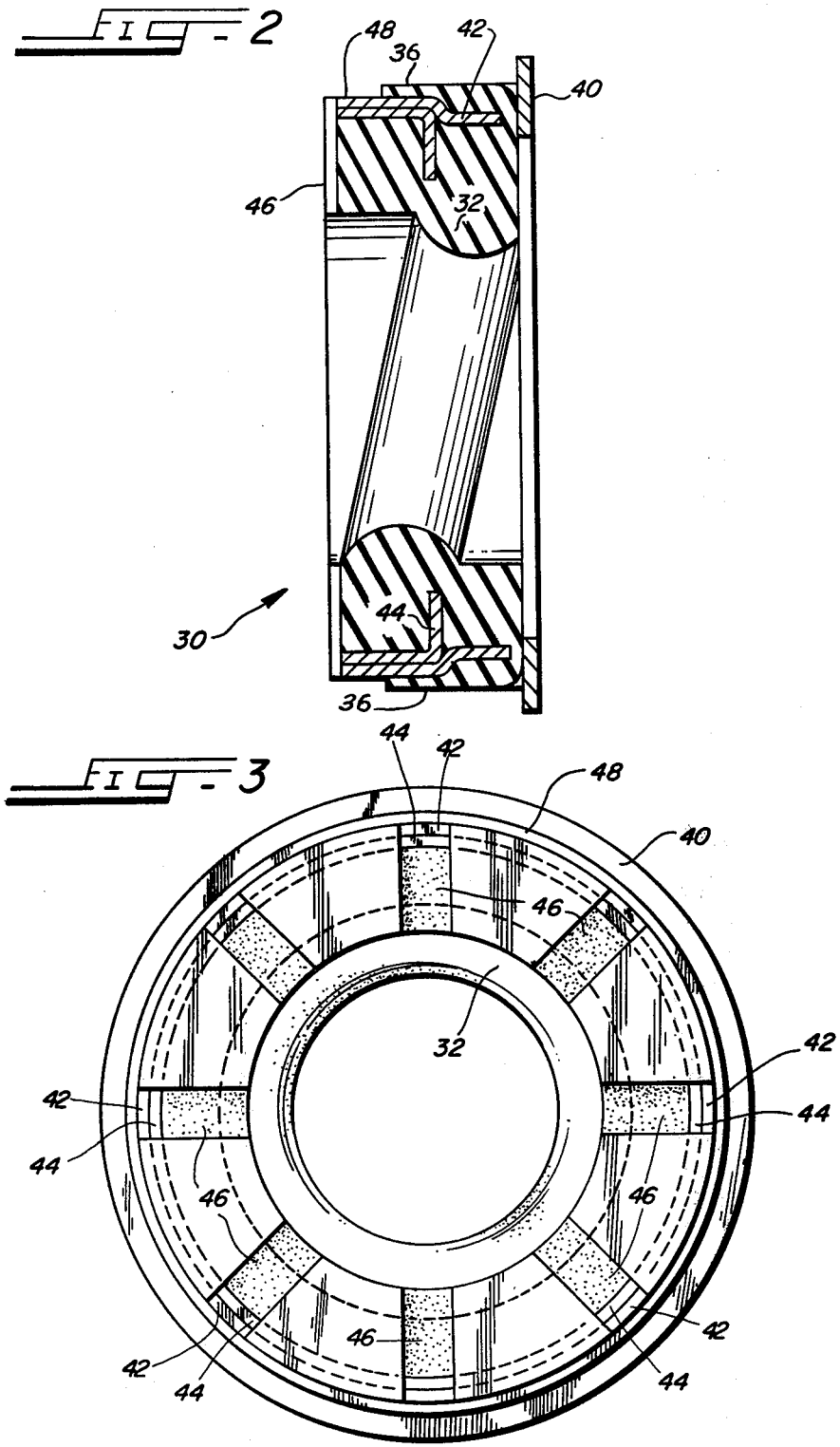

GROOVED SHAFT SEAL

BACKGROUND OF THE INVENTION

This invention relates to an elastomeric seal device for a threaded or grooved shaft within a housing. In one embodiment, this seal is interposed between a ball bearing nut and its threaded shaft operating within a hydraulic cylinder.

Ball bearing nuts and their associated screws present unusual sealing requirements. First, the sealing surface on the screw is defined by a thread which extends both axially and circumferantially of the screw. Because of the space required for greater than the outside diameter of the screw, thus presenting a large area to be sealed and exposing such a seal to substantial shearing forces. Additionally, the screw, having both translational and rotational motion relative to the ball bearing nut requires not only the use of a low friction material, but that such a seal be capable of withstanding substantial forces which are not uniformly applied to a single direction. Finally, it may be desirous of encapsulating this unit within a cylinder and using the nut as a hydraulic piston responsive to fluid pressure to assist reciprocation as controlled by rotary movement of the screw.

SUMMARY OF THE INVENTION

To meet these requirements, my invention takes the form of a ring seal having an inside diameter (I.D.) for mating with the screw or a shaft and an outside diameter (O.D.) for mating with the ball bearing nut or housing. Preferably, the I.D. of the seal is formed with a thread for mating with the thread of the screw, while the body of the seal is reinforced to accept the axial pressure imposed thereon. In addition, the outside diameter of the seal has a stepped portion exposed to fluid pressure which applies a radially inward force upon the seal to further enhance sealing.

Accordingly, it is an object of my invention to provide a seal which provides one or more of the following advantages:

1. effectively seals a threaded shaft within a housing;
2. is capable of sealing a large space exposed to high pressures and shearing forces;
3. effectively seals a rotational and translatable threaded shaft within a housing against fluid leakage;
4. permits a ball bearing nut to be used as a piston within a hydraulic cylinder to assist translational movement of the nut.

DESCRIPTION OF THE DRAWINGS

The method of achieving these and other objects are explained in the following specification and drawings in which:

FIG. 1 is a side elevational view in section disclosing a preferred embodiment of my invention in association with a ball bearing nut and screw, the section being taken through the center of the unit.

FIG. 2 is an enlarged side elevational view of the embodiment depicted in FIG. 1.

FIG. 3 is a front elevational view of the embodiment of FIG. 2.

DETAILED DESCRIPTION

As shown in FIG. 1, one use of my invention may be in a power assist steering mechanism. This mechanism includes a hydraulic cylinder 10 divided into two chambers 12 and 14 by a ball bearing nut 16 having an appropriately sealed cylindrical extension 15. This nut 16, acting as a two way piston, is reciprocated to rotate a bell crank 18 through gear connection 20. The reciprocation of the ball bearing nut is controlled by a steering column (not shown) of a vehicle constrained for rotation with the ball bearing screw 22 which extends through the flanged and sealed end of cylinder 10. Thus, manual rotation of the steering wheel will rotate the screw 22 which, through ball bearings 24, will effect translation of the nut 16 and rotation of bell crank 18 to turn the vehicle.

To power assist this movement, fluid pressure can be directed to either chamber 12 or 14 and, if properly sealed, these chambers will expand, applying a translation force to the nut. This fluid may be supplied from a sump (S) through a pump (P) to a directional flow control valve (symbolically illustrated at V), and to either of the chambers 12 or 14. While of no concern to my invention, the valve V will be operatively associated with rotational movement of the screw 22 as indicated by dotted lines of FIG. 1.

In utilizing the ball bearing nut in this manner, the space 25 between the O.D. of the screw 22 and the I.D. of the nut 16 must be sealed. Due to required clearance dimensions for the ball bearings, this space is large and may subject the seal to substantial shear. Moreover, the movement of the screw 22 relative to the nut 16 is both rotational and translational. Finally, the thread of the screw, being helical, requires a helically shaped sealing surface.

To meet these sealing requirements, a preferred embodiment of my invention takes the shape of a ring seal 30 whose I.D. includes a thread 32 which preferably has at least one complete revolution to mate with the thread 34 of screw 22. The width of the seal is preferably not less than the distance between two threads of the screw 22.

The O.D. 36 of the seal 30 is inserted within a counterbore 38 of the nut 16, and is retained in place by a snap ring 40 inserted within groove as shown. An interference fit between the O.D. 36 of the seal and counterbore 38 is preferable. Such aids in sealing the O.D. of the seal and precludes rotation of the seal relative to the ball nut housing 16. Moreover, to insure an interference fit and a substantial spring bias against the wall of the counterbore 38, an annular metal ring 42 is embedded in the seal.

In addition to the ring 42 which applies a radial bias to the seal 30, the invention may also include a radially extending reinforcing ring 44 embedded in the rubber. The ring 44 is used to reinforce the seal against shear applied by fluid pressure across the gap 25 between nut 16 and screw 22. These two radially and axially extending means 42 and 44 are preferably formed of two separate rings and telescoped within one another as shown in FIG. 2. Yet, alternative configuration, such as a single ring extending both radially and axially, may be acceptable.

In the specific evironment depicted, it has been found desirable to additionally add a fluid balancing means. This means may include radially extending slots or groove means 46 in the face of the seal which direct fluid pressure to the reduced O.D. 48 of the seal circumference for imposing an inward radially directed force to the seal 30.

In manufacture, the seal is formed of a hard elastomer having a shore A durometer hardness in excess of 90.

Preferably, the seal has a hardness of 55 shore D. Those skilled in the art of elastomers will find many compositions having this hardness. A preferred composition would include nitrile rubber, a filler and conventional molding agents. The composition may also include small amounts of polytetrafluoroethylene and microfibers of a polyamine to provide additional lubricity and strength.

In use in this embodiment, the rotation of the steering column and screw 22 to the right will shift the valve V to direct fluid into chamber 12. This fluid will act against the nut 16 to assist in its translation to the right causing rotation of the bell crank 18. Similarly, rotation of screw 22 in the opposite direction will shift valve V to direct fluid to chamber 14 moving the nut to the left. The use of the seal 30 is capable of sealing either of these chambers and of accepting the high forces imposed thereon.

While my invention, as specifically illustrated, is applied to sealing a threaded shaft within a fluid environment, it will have various other applications. Too, modifications of the invention will be apparent to those skilled in the art. Illustrative of these modifications would be the design of a ring seal utilizing fluid balance means on the I.D. or O.D. Similarly, the use of both radial or axial bias members may be used alone or in conjunction with the balancing means.

I claim:

1. In a hydraulic cylinder having a rotatable screw extending through one end and a ball bearing nut mounted thereon in sealing engagement with the cylinder walls, a seal means extending between said nut and screw for dividing said cylinder into two expansible fluid pressure chambers on opposite sides of said nut, said seal means including:
   (a) an annular ring seal having a threaded aperture extending therethrough for sealingly mating with the thread of said screw;
   (b) said seal having an external circumference in a mating interference fit with the internal diameter of said nut;
   (c) said seal including an annular metallic biasing means for biasing said seal into said interference fit; and
      (i) annular radially extending reinforcing means for accepting shear imposed axially upon said seal;
      (ii) slotted means exposing a portion of said external circumference to the fluid pressure within one of said chambers; and
   (d) said ring seal being formed of an elastomeric composition having a hardness in excess of 90 shore A.

2. A fluid seal for sealing the space between a ball bearing nut and screw comprising:
   (a) an elastomeric ring having an outside circumference in sealing engagement with the inside circumference of said ball bearing nut, and an internal threaded circumference in sealing engagement with the outside circumference of the screw; and
   (b) groove means exposed to fluid for directing fluid pressure to a portion of the outside circumference of said ring for balancing fluid pressure imposed on the internal threaded circumference 3. An apparatus as recited in claim 2 in which said ring includes metallic means biasing said outside circumference into an interference fit with said ball bearing nut.

4. An apparatus as recited in claim 2 in which said ring includes metallic means extending radially inward to reinforce said seal against axially imposed fluid pressure.

5. An apparatus as recited in claim 4 in which said ring includes metallic means biasing said outside circumference into an interference fit with said ball bearing nut.

6. In a hydraulic cylinder having a rotatable screw extending through one end and a ball bearing nut mounted thereon in sealing engagement with the cylinder walls, a seal means extending between said nut and screw for dividing said cylinder into two expansible fluid pressure chambers on opposite sides of said nut, said seal means including:
   (a) an annular ring seal having a threaded aperture extending therethrough for sealingly mating with the thread of said screw;
   (b) said seal having an external circumference in a mating interference fit with the internal diameter of said nut said circumference having a reduced diameter adjacent at least one side thereof for receiving fluid pressure;
   (c) said seal including an annular metallic biasing means for biasing said seal into said interference fit; and
      (i) annular radially extending reinforcing means for accepting shear imposed axially upon said seal; and
      (ii) fluid passage means exposing said reduced diameter of said external circumference to the fluid pressure within one of said chambers.

7. A ring seal for sealing the space between a housing and a grooved shaft comprising:
   (a) an annular elastomeric member having a ribbed aperture extending therethrough for sealingly mating with the grooved shaft;
   (b) said member having an external circumference adapted for a mating interference fit within a recess of said housing, a portion of said external circumference being relieved for receiving fluid pressure; and
   (c) said member having fluid passage means for exposing said portion of said external circumference to fluid pressure within said housing.

8. A ring seal for sealing the space between a housing and a rotatable threaded shaft comprising:
   (a) an annular ring formed of an elastomer having a durometer hardness in excess of 90 shore A for permitting rotation of said shaft with minimum friction;
   (b) said ring having an external circumference adapted for an interference fit with said housing in sealing engagement;
   (c) said ring having an internal circumference in sealing, mating engagement with said threaded shaft, said internal circumference having a thread which has at least one complete revolution for mating with the thread of said shaft; and
   (d) axially and radially extending reinforcing means formed in said ring for providing a radial bias in the direction of said interference fit and axial resistance to fluid pressure.

9. A ring seal as recited in claim 8 in which said ring has relief areas on the external circumference and groove means for directing fluid pressure to said relief areas.

* * * * *